United States Patent
Ashby, Jr. et al.

(10) Patent No.: US 9,553,827 B2
(45) Date of Patent: Jan. 24, 2017

(54) AUTOMATIC MODELING OF VIRTUAL RESOURCES WITH SIZING RECOMMENDATIONS

(71) Applicants: John Wiley Ashby, Jr., Austin, TX (US); Balaji Varadaraju, Austin, TX (US)

(72) Inventors: John Wiley Ashby, Jr., Austin, TX (US); Balaji Varadaraju, Austin, TX (US)

(73) Assignee: CA, Inc., New York, NY (US)

( * ) Notice: Subject to any disclaimer, the term of this patent is extended or adjusted under 35 U.S.C. 154(b) by 171 days.

(21) Appl. No.: 14/626,236

(22) Filed: Feb. 19, 2015

(65) Prior Publication Data

US 2016/0248646 A1    Aug. 25, 2016

(51) Int. Cl.
*H04L 12/911* (2013.01)
*H04L 12/26* (2006.01)
*H04L 12/24* (2006.01)

(52) U.S. Cl.
CPC .......... *H04L 47/78* (2013.01); *H04L 41/024* (2013.01); *H04L 41/0896* (2013.01); *H04L 43/0817* (2013.01); *H04L 43/16* (2013.01)

(58) Field of Classification Search
CPC ...................................... H04L 47/78
USPC ........................................... 709/224
See application file for complete search history.

(56) References Cited

U.S. PATENT DOCUMENTS

| 2009/0172693 | A1* | 7/2009 | Corum | G06F 9/505 718/105 |
| 2011/0225594 | A1* | 9/2011 | Iyengar | G06F 9/46 718/105 |
| 2013/0179916 | A1* | 7/2013 | Roberts | H04N 21/2407 725/32 |

OTHER PUBLICATIONS

Zhang et al., "Friendly Virtual Machines—Leveraging a Feedback-Control Model for Application Adaptation", 2005.*

* cited by examiner

*Primary Examiner* — O. C. Vostal
(74) *Attorney, Agent, or Firm* — Baker Botts L.L.P.

(57) ABSTRACT

A method includes accessing a database comprising a respective non-linear scalability model for each of a plurality of physical resources and each of a plurality of virtual resources in a virtualization environment. The method also includes generating a respective capacity consumption model for each of the plurality of virtual resources based on the non-linear scalability models. The method further includes determining a deviation from a predetermined threshold range in the respective capacity consumption model for a first virtual resource in the plurality of virtual resources. The method additionally includes determining a slope of the respective capacity consumption model for the first virtual resource, and determining a sizing recommendation for components of the first virtual resource based on the slope and the deviation. The method also includes modifying at least one of the components of the first virtual resource based on the sizing recommendation.

20 Claims, 11 Drawing Sheets

Sizing Report

| VM | OS | vCPUs | MEM | STORAGE | PTILE | RX | TREND | RECOMMENDED vCPUs | RECOMMENDED MEMORY | THRESHOLD DAYS | CLUSTER | CLUSTER ALLOC |
|---|---|---|---|---|---|---|---|---|---|---|---|---|
| vm_2 | LNX | 4 | 5 | 32 GB | 20 | 80 | — | 2 | 4 | 175 | prod_cluster2 | 35.00% |
| vm_3 | WIN | 4 | 8 | 75 GB | 20 | 18 | — | 2 | 4 | 175 | prod_cluster3 | 125.00% |
| vm_1 | WIN | 1 | 2 | 55 GB | 68 | 95 | ˅ | 2 | 4 | 22 | prod_cluster1 | 125.00% |

RULES BASED ON OS TYPE

SIZING GUIDANCE

POOL LEVEL RESOURCE VISIBILITY

WARNING RESIZE REQUIRED = 95%

FIG. 3

Sizing Report

| VM | OS | vCPU CONFIG. | vRAM CONFIG. | CPU UTIL | MEM UTIL |
|---|---|---|---|---|---|
| s79_r1 6.5_dod - eXchange 2013_dod3 | windows8_64guest | 1.00 | 4 | 58.5 | 58 |
| s38_r16.5_dod - exchange 2013_dod6 | windows8_64guest | 1.00 | 4 | 53 | 51 |
| netmriclient | winnetenterpriseguest | 2.00 | 2 | 50.48 | 14.5 |
| s25_itwael 1.4_1242012 | rhel5_64guest | 2.00 | 8 | 50 | 22 |
| interop-identity manger server | winnetenterpriseguest | 1.00 | 2 | 47.8 | 20.8 |
| s83_r16.5dod - exchange 2013_dod9 | windows8_64guest | 1.00 | 4 | 48 | 52 |
| dod-na-nms-p03 | windows7server64guest | 1.00 | 3 | 43.2 | 9.88 |
| s83_r16.5dod - exchange 2013_dod5 | windows8_64guest | 1.00 | 4 | 42.5 | 65 |
| s152_esx2_nimsoft1.5_dod6-s154 | vmismel5guest | 2.00 | 10 | 42 | 5.33 |
| s103_govminder_sps1.1_dod3 | windows7server64guest | 1.00 | 4 | 41.8 | 27.2 |

| STORAGE UTIL | CPU CHANGE | MEM CHANGE | vCPUs RESIZE | vRAM RESIZE | CLUSTER | CLUSTER vCPU ALLOC. | CLUSTER vRAM ALLOC. |
|---|---|---|---|---|---|---|---|
| | | | | | 2014-01-23 17:44 - 2014-01-23 18:44 UTC | | |
| 53.5 | none | none | 1 | 4 | dod_democluster_64748 | 205 | 147 |
| 49.57 | none | none | 1 | 4 | dod_democluster_64748 | 205 | 147 |
| 58.6 | none | none | 2 | 1 | dod_democluster_64748 | 205 | 147 |
| 74.62 | none | none | 2 | 8 | dod_democluster_64748 | 205 | 147 |
| 65.21 | none | none | 1 | 2 | dod_democluster_64748 | 205 | 147 |
| 83.33 | none | none | 1 | 4 | dod_democluster_64748 | 205 | 147 |
| 83.01 | none | none | 1 | 2 | dod_democluster_64748 | 205 | 147 |
| 52.17 | none | none | 1 | 4 | dod_democluster_64748 | 205 | 147 |
| 53.42 | none | none | 2 | 1 | dod_democluster_64748 | 205 | 147 |
| 29.09 | none | none | 1 | 4 | dod_democluster_64748 | 205 | 147 |
| | | | | | | MAX PER PAGE | 10 ▶ |

FIG. 4B

VM Sizing Report - All Clusters

| VM | OS | vCPU CONFIG. | vCPUs RESIZE | CPU UTIL | vRAM CONFIG. |
|---|---|---|---|---|---|
| s30_infra00_dod5-s30 | windows7server64guest | 1 | 2 ⇧ | 99% | 4 |
| s19_ehealth-samv5.2_dod9 | rhel5_64guest | 1 | 2 ⇧ | 97% | 4 |
| dod-na-arc-p02 | windows 7server64guest | 2 | 4 ⇧ | 87% | 8 |
| s19_ehealth-samv5.2_dod7 | rhel5_64guest | 1 | 2 ⇧ | 82% | 4 |
| dod-na-uim-p01_3.0 | sles11_64guest | 2 | 4 ⇧ | 81% | 16 |
| s21_esx2-samv5.2_dod11 | | 2 | 2 | 69% | 10 |
| dod-na-cptymgr-p01-vpm | windows7server64guest | 1 | 1 | 68% | 4 |
| s41_mathapp-1-Immersion_student2-s41 | windows7server64guest | 2 | 2 | 66% | 4 |
| s16_esx2-samv5.2_dod6 | | 2 | 2 | 60% | 10 |
| nimsoftsandboxv7.6.1_lcbase | windows7server64guest | 2 | 2 | 60% | 6 |

| vRAM RESIZE | MEM UTIL | STORAGE CONFIG | STORAGE UTIL % | CLUSTER | CLUSTER vCPU ALLOC. | CLUSTER vRAM ALLOC. |
|---|---|---|---|---|---|---|
| 1 ⇒ | 7% | GB | | demos_4799 | 474% | 194% |
| 2 ⇒ | 25% | 111 GB | 55% | demos_4799 | 474% | 194% |
| 10 ⇐ | 81% | 128 GB | 83% | demos_4799 | 474% | 194% |
| 2 ⇒ | 25% | 111 GB | 56% | demos_4799 | 474% | 194% |
| 8 ⇒ | 39% | 216 GB | 54% | devlab_1125 | 221% | 139% |
| 3 ⇒ | 21% | 103 GB | 35% | demos_4799 | 474% | 194% |
| 2 ⇒ | 38% | 260 GB | 100% | demos_4799 | 474% | 194% |
| 3 ⇒ | 43% | 67 GB | 60% | demos_4799 | 474% | 194% |
| 4 ⇒ | 28% | 102 GB | 37% | demos_4799 | 474% | 194% |
| 6 | 80% | 169 GB | 20% | demos_4799 | 474% | 194% |

2014-05-20 20:04 - 2014-08-20 20:04 UTC

MAX PER PAGE 10 ▾ continued from FIG. 5A

FIG. 5B demos_4799 - VM Sizing Report

| VM | OS | vCPU CONFIG. | vCPUs RESIZE | CPU UTIL | vRAM CONFIG. |
|---|---|---|---|---|---|
| s21_ehealth-samv5.2_dod11 | rhel5_64guest | 1 | 2 ⇐ | 99% | 4 |
| s27_cmlinux_rsa | rhel5_64guest | 1 | 2 ⇐ | 97% | 1 |
| s19_eheal_Th-samv5.2_dod9 | rhel5_64guest | 1 | 2 ⇐ | 97% | 4 |
| s19_esx2-samv5.2_dod9 | windows7server64guest | 2 | 2 | 78% | 10 |
| dod-na-cptymgr_r-p01-vpm | windows7server64guest | 1 | 1 | 78% | 4 |
| od-na-arc-p02 | windows7server64guest | 2 | 2 ⇒ | 66% | 8 |
| s41_malhapp-1-immersion_student2-s41 | windows7server64guest | 2 | 2 ⇒ | 66% | 4 |
| s11_infra00 | windows7server64guest | 1 | 1 | 55% | 4 |
| itcapa | windows7server64guest | 2 | 2 ⇒ | 55% | 8 |
| s24_nim-network | windows7server64guest | 2 | 2 ⇒ | 53% | 1.5 |

| vRAM RESIZE | MEM UTIL | STORAGE CONFIG | STORAGE UTIL |
|---|---|---|---|
| ⇨ 1 | 19% | 111 GB | 56% |
| 1 | 15% | 39 GB | 62% |
| ⇨ 2 | 25% | 111 GB | 55% |
| ⇨ 3 | 20% | 102 GB | 37% |
| ⇨ 2 | 32% | 260 GB | 100% |
| ⇦ 10 | 81% | 128 GB | 83% |
| ⇨ 3 | 42% | 67 GB | 60% |
| 4 | 61% | GB | % |
| ⇨ 1 | 4% | 142 GB | 94% |
| ⇨ 1 | 19% | 25 GB | 100% |

2014-08-06 20:26 – 2014-08-20 20:26 UTC

MAX PER PAGE [10 ▽]

FIG. 6B continued from FIG. 6A ③ continued from FIG. 6A ③

| Cluster State – Current | 2014-08-06 20:26 – 2014-08-20 20:26 UTC |
|---|---|
| CLUSTER PARAMETER | VALUE |
| Current Cluster vCPU Allocation | 554 vCPUs |
| Current Cluster vCPU Allocation (%) | 247% |
| Current Cluster vRAM Allocation (GB) | 1776 GB |
| Current Cluster vRAM Allocation (%) | 99.00 VMs |
| Current Cluster CPU Utilization (%) | 42.69% |
| Current Cluster Memory Utilization (%) | 76.67% |
| VM to Host Ratio | 46:1 |
| Total VMs | 368 VMs |
| Total Cluster CPU Capacity | 224 vCPUs |
| Total Cluster Memory Capacity | 1791 GB |
| 1 OF 1 | MAX PER PAGE: 10 ▽ |

FIG. 7A

| Cluster State - Post Resize | 2014-08-06:20:26 - 2014-08-20:20:26 UTC |
|---|---|
| CLUSTER PARAMETER | VALUE |
| Optimized Cluster CPU Allocation (vCPUs) | 368 vCPUs |
| Optimized Cluster CPU Allocation (%) | 164% |
| Optimized Cluster Memory Allocation (GB) | 667 GB |
| Optimized Cluster Memory Allocation (%) | 37% |
| VMs Requiring Optimization (Total Count) | 309 VMs |
| VMs Requiring vCPU Config Change | 158 VMs |
| VMs Requiring vRAM Config Change | 305 VMs |
| VMs Requiring Storage Optimization | 36 VMs |
| Potential change in # of vCPUs | -186 vCPUs |
| Potential change in GB of vRAM | -1109 vRAM |
| 1 OF 1 | MAX PER PAGE: 10 |

FIG. 7B

AUTOMATIC MODELING OF VIRTUAL RESOURCES WITH SIZING RECOMMENDATIONS

BACKGROUND

The disclosure relates generally to virtual resource models, and more specifically to automatic modeling of virtual resources with sizing recommendations.

SUMMARY

According to one embodiment of the disclosure, a method includes accessing a database comprising a non-linear scalability model for each of a plurality of physical resources and each of a plurality of virtual resources in a virtualization environment. The method also includes generating a respective capacity consumption model for each of the plurality of virtual resources based on the non-linear scalability models. The method further includes determining a deviation from a predetermined threshold range in the respective capacity consumption model for a first virtual resource in the plurality of virtual resources. The method additionally includes determining a slope of the respective capacity consumption model for the first virtual resource, and determining a sizing recommendation for components of the first virtual resource based on the slope and the deviation. The method further includes modifying at least one of the components of the first virtual resource based on the sizing recommendation.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

FIG. 3 illustrates an example user interface in a system for automatic modeling of virtual resources with sizing recommendations in accordance with a non-limiting embodiment of the present disclosure.

FIG. 4A illustrates a portion of an example resource sizing report generated in a system for automatic modeling of virtual resources with sizing recommendations in accordance with a non-limiting embodiment of the present disclosure.

FIG. 4B is a continuation of FIG. 4A, and illustrates a portion of an example resource sizing report generated in a system for automatic modeling of virtual resources with sizing recommendations in accordance with a non-limiting embodiment of the present disclosure.

FIG. 5A illustrates a portion of an example resource sizing report generated in a system for automatic modeling of virtual resources with sizing recommendations in accordance with a non-limiting embodiment of the present disclosure.

FIG. 5B is a continuation of FIG. 5A, and illustrates a portion of an example resource sizing report generated in a system for automatic modeling of virtual resources with sizing recommendations in accordance with a non-limiting embodiment of the present disclosure.

FIG. 6A illustrates a portion of an example resource sizing report generated in a system for automatic modeling of virtual resources with sizing recommendations in accordance with a non-limiting embodiment of the present disclosure.

FIG. 6B is a continuation of FIG. 6A, and illustrates a portion of an example resource sizing report generated in a system for automatic modeling of virtual resources with sizing recommendations in accordance with a non-limiting embodiment of the present disclosure.

FIG. 7A illustrates an example report regarding current cluster state generated in a system for automatic modeling of virtual resources with sizing recommendations in accordance with a non-limiting embodiment of the present disclosure.

FIG. 7B illustrates an example report regarding projected cluster state generated in a system for automatic modeling of virtual resources with sizing recommendations in accordance with a non-limiting embodiment of the present disclosure.

DETAILED DESCRIPTION

Figure 1:
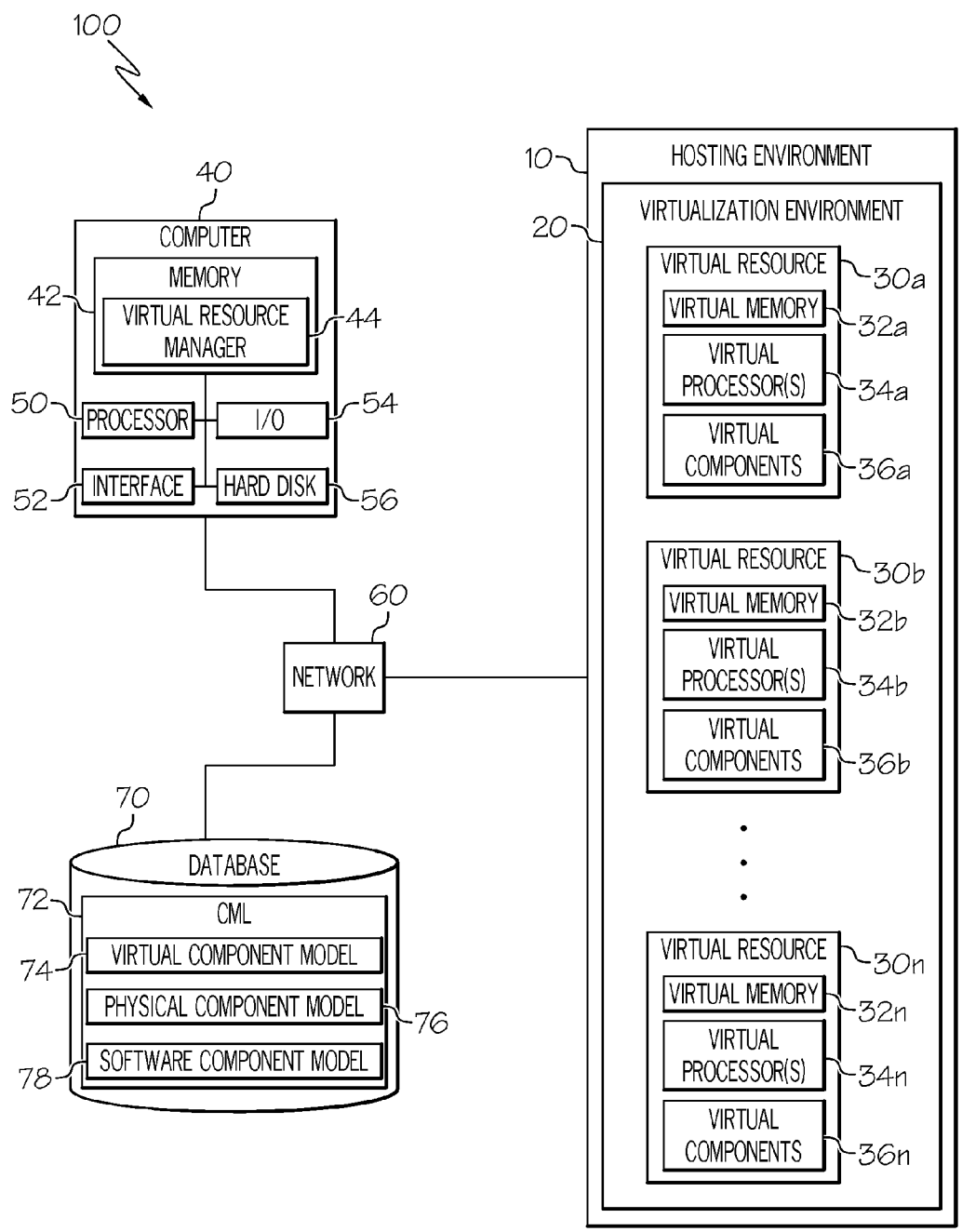
FIG. 1 illustrates a block diagram of a system for automatic modeling of virtual resources with sizing recommendations in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Certain capacity management systems may assist IT administrators in understanding capacity needs, optimizing asset utilization and cutting costs across large scale IT environments. Capacity management systems may also help maintain higher service levels across high-volume physical, virtual and cloud environments while helping to reduce capital expenditures and operating expenditures associated with hardware, software, power, and cooling. In addition, these systems may help manage information technology changes with tools that predict the impact of workload increases, architectural changes or new application deployments.

Capacity management systems may include capacity modeling capabilities, wherein virtual resource utilization and capacity are projected for a particular IT infrastructure. Capacity management systems may also include virtual resource management functionality that assists administrators by interpreting capacity modeling results into actionable analysis that assist in optimizing workload placement and right-sizing of virtual resources.

Virtual resource management software may utilize capacity modeling processes to, inter alia, analyze workload placement and right-sizing of virtual resources, tailor virtual resource provisioning to an organization's needs, and optimize resource capacity and performance. Models may be generated using a library of virtual and/or physical computing components (i.e., the component model library, or "CML"). The CML may include models for a variety of platforms, resources, virtualization products, operating systems, processor architectures, and/or memory configurations. Models from the CML may be used to model performance of a virtualization environment by selecting models that correspond to each virtual resource in the environment.

Resource scores may be generated for each virtual resource based on the selected CML models and current utilization metrics. Resource scores may be a normalized, platform independent metric for identifying under/over-utilized virtual resources for consolidation and/or redeployment.

However, current implementations may require a series of manual operations in order to model virtual resource configuration capacity consumption and head room. For example, one such capacity modeling process may require the following steps:

First, the data center is configured for the model, which requires collection of data from a data manager, configuration of data center assets, and configuration and/or calibration of workloads. Each of these actions may require manual user operation and configuration.

Next, the capacity modeling process may additionally require creation of a model. This may require selection of components and/or servers, determination of baseline statistics and metrics and/or workload mapping and association functions. Each of these steps may require manual user operation and configuration.

Additionally, the capacity modeling process may further require model scenario output publishing. This may require scenario creation, scenario refinement, and/or publishing of end results. Each of these steps may require manual user operation and configuration.

Each of these steps may take a considerable amount of time and effort. Thus, IT administrators that are responsible for a vast number of physical and/or virtual resources, such as a system administrator for a virtual environment, data center, server farm, or the like, may only be able to model a limited number of systems. For example, certain organizations maintain thousands of virtual systems. Administrators of such systems may lack sufficient resources to undertake the complex configuration required for modeling each system that the organization maintains. Accordingly, system administrators may automate capacity modeling against a larger number of systems.

For example, certain organizations may have over 1,000 host servers, over 10,000 virtual machines, and/or over 100 clusters. IT administrators may lack the resources required for scheduling, configuring, analyzing, and reacting/responding to capacity performance, capacity consumption, and other performance metrics for each of these resources.

Automatic resize operations may be conducted based on the generated models. The resize operations may compare the generated models to threshold rules and trend/slope data. For example, if a generated model shows CPU capacity above a predetermined threshold, regression analysis may be applied to the model to determine the slope of the capacity curve. If current CPU capacity consumption is trending up, then additional system resources may be provisioned according to the sizing templates. However, if CPU capacity consumption is trending down, no new sizing operations may be triggered.

The teachings of the present disclosure may overcome some or all of the challenges in configuring capacity models by automating one or more of the above described processes and providing sizing recommendations based on certain predetermined rules and parameters.

With reference to FIG. 1, a system 100 for automatic modeling of virtual resources with sizing recommendations is illustrated in accordance with a particular non-limiting embodiment of the present disclosure. System 100 includes computer 40, database 70, hosting environment 10. Each of these components is connected via network 60. Computer 40 includes memory 42, processor 50, I/O device 54, interface 52, and hard disk 56. Processor 50 may be operable to load instructions from hard disk 56 into memory 42 and execute processes, such as virtual resource manager 44 in memory 42.

Database 70 includes CML 72, which includes virtual component models 74, physical component models 76, and software component models 78. Hosting environment 10 includes virtualization environment 20, which includes virtual resources 30a-n. Virtual resources 30a-n include corresponding virtual memory 32a-n, virtual processors 34a-n, and virtual components 36a-n.

In certain embodiments, virtual resource manager may access database 70 via network 60 to retrieve non-linear scalability models for each physical and virtual resource in hosting environment 10. For example, hosting environment 10 may include multiple servers, clusters, and other configurations of hardware components. Hardware resources may host virtualization environment 20 along with virtual resources 30a-n. Thus, scalability models for resources in hosting environment 10 may be selected based on the configuration of hosting environment 10.

In certain embodiments, a process discovers hosting environment 10 configurations. For example, a process determines that a particular server is a SPARC T5-4 Server, and that this particular server has a particular hardware configuration. Further the process may discover that the particular server hosts one or more virtual resources, such as virtual machines or the like. The process may discover the type and configuration of each virtual machine executing on this particular server or a group of particular servers. For example, if a virtual machine is executing as a server cluster, the process may discover configuration information for the cluster and/or the particular servers in the cluster as well as the particular virtual resources and applications executing on the server cluster.

In certain embodiments, scalability models are selected from the CML 72 database 70 based on the detected architecture/configuration of hosting environment 10. In certain embodiments, aspects of hosting environment 10 configuration may be manually configured. In certain embodiments, configuration of hosting environment 10 may be conducted entirely by a manual process.

In certain embodiments, virtual resource manager generates a respective capacity consumption model for each of the plurality of virtual resources based on each non-linear scalability model. For example, a custom model for hosting environment 10 and each individual resource (e.g., physical and virtual) may be generated by integrating individual scalability models for each resource in hosting environment 10. The capacity consumption model for a particular resource may be dependent on scalability models for each associated resource. For example, virtual resource 30a may be dependent on one or more of the virtual component scalability model corresponding to its own configuration (i.e., virtual resource 30a scalability model), a hardware scalability model corresponding to virtualization environment 20 configuration, and one or more software scalability models corresponding to a software configuration of virtual resource 30a.

The capacity consumption model may be used to predict future capacity and consumption metrics including determining when to add more resources, down-size provisioned resources, or right-size resources. In certain embodiments, virtual resource manager 44 may perform these resource management operations by one or more of the following steps:

Virtual resource manager 44 may perform resource management operations by determining a deviation from a predetermined threshold range in the respective capacity consumption model for a first virtual resource. For example, a baseline capacity utilization may be set. Deviation from that baseline may be detected.

Virtual resource manager 44 may additionally perform resource management operations by determining a slope of the respective capacity consumption model for the first virtual resource. For example, an increase in capacity utilization may be detected by determining a slope of a capacity utilization curve.

Virtual resource manager 44 may determine a sizing recommendation for the components of the first virtual resource based on the detected slope and deviation, as well as any additional steps or tests executed. For example, if the capacity utilization curve is above the baseline value and it is sloping up, virtual resource manager 44 may provision and/or recommend provisioning additional resources to better handle the capacity demand.

Figure 2:
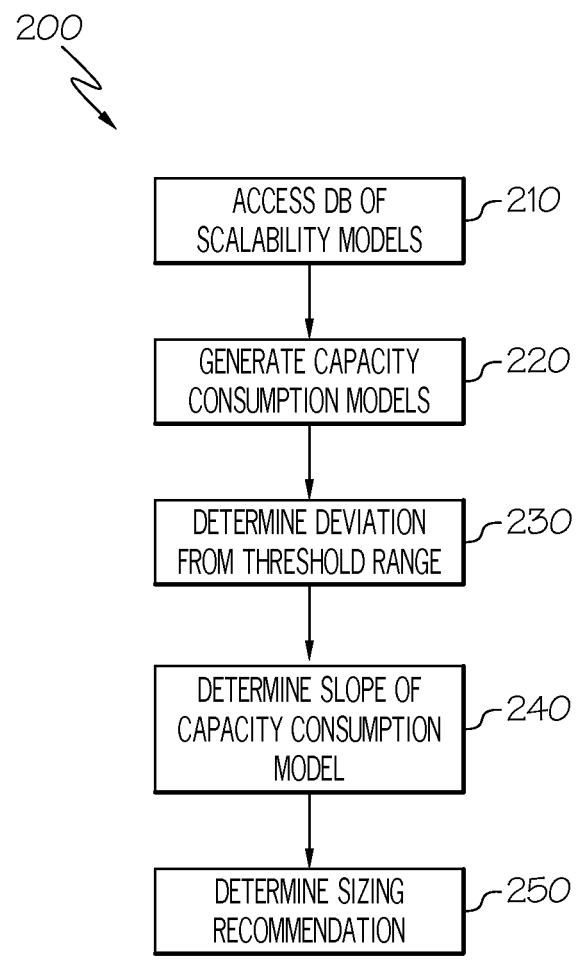
FIG. 2 illustrates a flow chart of a method for automatic modeling of virtual resources with sizing recommendations in accordance with a non-limiting embodiment of the present disclosure.

With reference to FIG. 2, a method 200 for automatic modeling of virtual resources with sizing recommendations is illustrated in accordance with a particular non-limiting embodiment of the present disclosure. At step 210 a database of scalability models is accessed. For example, a CML library may contain references to many scalability models for various components of an enterprise IT infrastructure including hardware, software, and virtual resource components. Scalability models corresponding to components in an IT infrastructure may be selected or accessed.

At step 220, capacity consumption models may be generated for components of the IT infrastructure based on the selected scalability models. At step 230, a deviation from a threshold range is detected in the capacity consumption models. At step 240, a slope of a capacity consumption model is determined. At step 250, a sizing recommendation for the resource is determined based on whether there was a deviation from the threshold range and if the slope of the capacity consumption model is positive or negative. For example, if capacity utilization is decreasing (i.e., headroom is increasing) and capacity utilization is below a certain threshold range, a recommendation may be generated to down-size the resource. For example, fewer virtual resources may be provisioned for a virtual resource.

In certain embodiments, performance metric data points for a large scale IT infrastructure, such as a cloud environment, are compiled in a view. The view may be a materialized view created nightly. Traditionally, system administrators may manually manage performance using these generated views. The teachings of the present disclosure may utilize this performance data and CML components corresponding to resources in an IT environment to generate capacity consumption models. These capacity consumption models may be based on historical data trends, but may be an excellent predictor of future capacity requirements. For example, using the above described example, capacity thresholds may be used along with slope detection capabilities to determine sizing recommendations for particular components in an IT environment.

In certain embodiments, sizing rules for virtual environments may be set using templates. For example, one organization may specify that only virtual machines having certain configurations (e.g., two processors with four GB of memory) are to be provisioned/used in the virtual environment. Virtual machine templates may specify these parameters as sizing guidelines. Thus, sizing recommendations may be made according to the virtual machine templates. For example, a virtual machine that requires more processing power may be re-sized to a virtual machine having the next highest processing capacity based on a virtual machine template specification.

In one example, virtual machine templates may be specified based on the operating system of the virtual machine. In this example, MICROSOFT WINDOWS™ templates include the following configurations: one processor with four GB of memory, one processor with eight GB of memory, two processors with four GB of memory, and two processors with eight GB of memory. LINUX™ templates include the following configurations: two processors with four GB of memory, two processors with six GB of memory, two processors with eight GB of memory, and eight processors with twelve GB of memory.

Accordingly, when an automatic resize operation of a virtual machine is performed, the system may account for virtual resource operating system and available sizing templates for sizing operations.

Additionally, cluster and/or pool level resources may be accounted for in the above analysis. For example, if the system recommends increasing provisioned CPU's when a resource pool is oversubscribed, then not enough resources may be available in the resource pool. Thus, available resources and demand for those resources in resource pools may be examined and reported to a user. In certain embodiments, resizing operations may still occur with an oversubscribed resource pool. However, the system administrator may be notified of the shortage in the resource pool so that appropriate action may be taken.

In one example, the system may generate weekly trend reports that notify stakeholders of usage trends in virtual environments. Exception reports may also be generated that specify which systems are outliers in terms of usage and/or performance. Allocation reports may detail how resources are being or should be allocated. Aggregate detail reports may contain details on multiple metrics and underlying resources. For example, metrics for a specific set of virtual machines and/or associated clusters may be determined and displayed in a report.

The teachings of the present disclosure may enable generation of a sizing report. The sizing report may contain performance data regarding virtual resources in a virtualization environment, and may be automatically generated nightly, without user configuration.

Users may assign sizing rules for a given parameter. In certain embodiments, default or automatic sizing rules may be in place. The sizing rules may automatically right-size (e.g., up or down) virtual resources based on the next highest template resource if the slope of the metric that is the subject of the sizing rule indicates a trend in line with a provisioning strategy. For example, if CPU capacity consumption is declining and falls below a sizing rule threshold, the system may determine the slope and/or trend of the CPU consumption and my right-size the virtual resource down to the next CPU configuration down.

Users may modify sizing rule parameters as needed with a user interface. Thus, when the values in the sizing report increase above a certain level specified by either default or user-specified sizing rules, virtual resources may be automatically right-sized to respond accordingly.

With reference to FIG. 3, an example user interface in a system for automatic modeling of virtual resources with sizing recommendations is illustrated in accordance with a particular non-limiting embodiment of the present disclosure. The user interface illustrated in FIG. 3 displays example sizing recommendation reports for three virtual resources, vm_1, vm_2, and vm_3.

Each virtual resource includes configuration information including operating system, number of virtual CPU's, memory, storage, etc. Each virtual resource additionally includes resource score information in the column labeled "RX". A graphical display shows a warning for vm_1. A mouse tool-tip displays the text "Warning, Resize required=95%." In this example, the sizing report may be recommending a resizing operation for virtual resource vm_1. As indicated, vm_1 capacity consumption is increasing (indicated by the up arrow in the display), and vm_1 resource score is at 95, indicating a high capacity consumption rate.

In this example, sizing recommendations may be in the form of graphics with mouse tool-tip text that appears on a mouse hover-over event. However, as illustrated in other figures described below, sizing recommendations may take many forms. Further, sizing recommendations may be automatically implemented. For example, FIG. 3 displays cluster allocation percentage. A resource management process may determine, based on cluster allocation and other hardware utilization resources whether adding additional physical or virtual resources to implement a sizing recommendation automatically is feasible.

With reference to FIGS. 4A and B, another example sizing report generated in a system for automatic modeling of virtual resources with sizing recommendations is illustrated in accordance with a non-limiting embodiment of the present disclosure. FIG. 4B is a continuation of the example report of FIG. 4A. Information regarding each virtual machine is listed in the report. For example, operating system, virtual CPU configuration, RAM configuration, CPU utilization, and memory utilization information is illustrated in FIG. 4A. Continuing to FIG. 4B, storage utilization, and resource change information is illustrated, along with resize recommendations, and cluster information. In certain embodiments, this information may be utilized to manually resize and/or automatically resize virtual machine configurations.

In certain embodiments, cluster configuration information may be used to determine whether cluster's have available resources to accommodate resize operations. For example, a cluster may have shared resources in a pool that are utilized as needed. Since all resources may not be utilized at all times, fewer resources may be provisioned for the pool than is required to service all resources at once. However, based on trend and threshold data, as well as resizing recommendations, the sizing reports generated in accordance with the teachings of the present disclosure may determine whether cluster resources (e.g., cluster or pool hardware resources) are available to service resizing actions.

With reference to FIGS. 5A and B, an example sizing report generated in a system for automatic modeling of virtual resources with sizing recommendations is illustrated in accordance with a non-limiting embodiment of the present disclosure. FIG. 5B is a continuation of the example report of FIG. 5A. Virtual resource configuration sizing recommendations may be displayed with graphics illustrating trend, change, or slope information, and utilization metrics may be displayed as percentages.

With reference to FIGS. 6A and 6B, yet another example sizing report generated in a system for automatic modeling of virtual resources with sizing recommendations in accordance with a non-limiting embodiment of the present disclosure. FIG. 6B is a continuation of the example report of FIG. 6A.

FIG. 7A illustrates an example cluster state report generated in a system for automatic modeling of virtual resources with sizing recommendations in accordance with a non-limiting embodiment of the present disclosure. This example report may reflect the current cluster state of a server cluster. For example, various metrics may be displayed in order to aid an IT administrator in virtual resource resize operations. In certain embodiment, a virtual resource manager may automatically initiate sizing operations based on cluster capacity utilization and headroom.

FIG. 7B illustrates an example cluster state report generated in a system for automatic modeling of virtual resources with sizing recommendations in accordance with a non-limiting embodiment of the present disclosure. This example report may reflect the forecasted, projected, or current state of cluster resources after virtual resource resizing operations have been executed. Thus, IT administrators may utilize this information to test example resize operations and their effects on server cluster resources.

Configuration of modern capacity modeling processes may be divided into certain sections. For example, one capacity modeling process may be divided into three distinct sections that may each have separate sub-sections and/or tasks associated with them. Each of these sections/tasks may be manual and may be required to model system capacity. Further, a user may be required to manually select which virtual machine/servers, out of numerous components across an enterprise virtualization environment, are to be included as part of the capacity modeling operation.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   accessing a database comprising a respective non-linear scalability model for each of a plurality of physical resources and each of a plurality of virtual resources in a virtualization environment;
   generating, using a processor, a respective capacity consumption model for each of the plurality of virtual resources based on the non-linear scalability models;
   determining a deviation from a predetermined threshold range in the respective capacity consumption model for a first virtual resource in the plurality of virtual resources;
   determining a slope of the respective capacity consumption model for the first virtual resource;
   determining a sizing recommendation for components of the first virtual resource based on the slope and the deviation; and
   modifying at least one of the components of the first virtual resource based on the sizing recommendation.

2. The method of claim 1, further comprising:
receiving a plurality of virtual resource templates, wherein determining the sizing recommendation further comprises determining a first virtual resource template in the plurality of virtual resource templates that accommodates the respective capacity consumption model for the first virtual resource.

3. The method of claim 1, further comprising:
determining whether a resource pool for the virtualization environment can accommodate implementation of the sizing recommendation on the first virtual resource.

4. The method of claim 1, further comprising:
consolidating the first virtual resource based on the sizing recommendation, wherein the predetermined threshold range comprises a lower bound, and wherein the deviation is determined based on values in the respective capacity consumption model for the first virtual resource that are below the lower bound.

5. The method of claim 1, further comprising:
increasing virtual computing resources for the first virtual resource based on the sizing recommendation, wherein the predetermined threshold range comprises an upper bound, and wherein the deviation is determined based on values in the respective capacity consumption model for the first virtual resource that are above the upper bound.

6. The method of claim 1, further comprising:
receiving a processing capacity consumption threshold range; and
receiving a memory capacity consumption threshold range, wherein the predetermined threshold range comprises the processing capacity consumption threshold range and the memory capacity consumption threshold range.

7. The method of claim 1, further comprising:
automatically determining the predetermined threshold range based on historical performance of the respective capacity consumption model for the first virtual resource.

8. A computer configured to access a storage device, the computer comprising:
a processor; and
a non-transitory, computer-readable storage medium storing computer-readable instructions that when executed by the processor cause the computer to perform:
accessing a database comprising a respective non-linear scalability model for each of a plurality of physical resources and each of a plurality of virtual resources in a virtualization environment;
generating a respective capacity consumption model for each of the plurality of virtual resources based on the non-linear scalability models;
determining a deviation from a predetermined threshold range in the respective capacity consumption model for a first virtual resource in the plurality of virtual resources;
determining a slope of the respective capacity consumption model for the first virtual resource;
determining a sizing recommendation for components of the first virtual resource based on the slope and the deviation; and
modifying at least one of the components of the first virtual resource based on the sizing recommendation.

9. The computer of claim 8, wherein the computer-readable instructions further cause the computer to perform:
receiving a plurality of virtual resource templates, wherein determining the sizing recommendation further comprises determining a first virtual resource template in the plurality of virtual resource templates that accommodates the respective capacity consumption model for the first virtual resource.

10. The computer of claim 8, wherein the computer-readable instructions further cause the computer to perform:
determining whether a resource pool for the virtualization environment can accommodate implementation of the sizing recommendation on the first virtual resource.

11. The computer of claim 8, wherein the computer-readable instructions further cause the computer to perform:
consolidating the first virtual resource based on the sizing recommendation, wherein the predetermined threshold range comprises a lower bound, and wherein the deviation is determined based on values in the respective capacity consumption model for the first virtual resource that are below the lower bound.

12. The computer of claim 8, wherein the computer-readable instructions further cause the computer to perform:
increasing virtual computing resources for the first virtual resource based on the sizing recommendation, wherein the predetermined threshold range comprises an upper bound, and wherein the deviation is determined based on values in the respective capacity consumption model for the first virtual resource that are above the upper bound.

13. The computer of claim 8, wherein the computer-readable instructions further cause the computer to perform:
receiving a processing capacity consumption threshold range; and
receiving a memory capacity consumption threshold range, wherein the predetermined threshold range comprises the processing capacity consumption threshold range and the memory capacity consumption threshold range.

14. The computer of claim 8, wherein the computer-readable instructions further cause the computer to perform:
automatically determining the predetermined threshold range based on historical performance of the respective capacity consumption model for the first virtual resource.

15. A computer program product comprising:
a computer-readable storage medium having computer-readable program code embodied therewith, the computer-readable program code comprising:
computer-readable program code configured to access a database comprising a respective non-linear scalability model for each of a plurality of physical resources and each of a plurality of virtual resources in a virtualization environment;
computer-readable program code configured to generate a respective capacity consumption model for each of the plurality of virtual resources based on the non-linear scalability models;
computer-readable program code configured to determine a deviation from a predetermined threshold range in the respective capacity consumption model for a first virtual resource in the plurality of virtual resources;
computer-readable program code configured to determine a slope of the respective capacity consumption model for the first virtual resource;

computer-readable program code configured to determine a sizing recommendation for components of the first virtual resource based on the slope and the deviation; and computer-readable program code configured to modify at least one of the components of the first virtual resource based on the sizing recommendation.

16. The computer program product of claim 15, wherein the computer-readable program code further comprises:

computer-readable program code configured to receive a plurality of virtual resource templates, wherein determining the sizing recommendation further comprises determining a first virtual resource template in the plurality of virtual resource templates that accommodates the respective capacity consumption model for the first virtual resource.

17. The computer program product of claim 15, wherein the computer-readable program code further comprises:

computer-readable program code configured to determine whether a resource pool for the virtualization environment can accommodate implementation of the sizing recommendation on the first virtual resource.

18. The computer program product of claim 15, wherein the computer-readable program code further comprises:

computer-readable program code configured to consolidate the first virtual resource based on the sizing recommendation, wherein the predetermined threshold range comprises a lower bound, and wherein the deviation is determined based on values in the respective capacity consumption model for the first virtual resource that are below the lower bound.

19. The computer program product of claim 15, wherein the computer-readable program code further comprises:

computer-readable program code configured to increase virtual computing resources for the first virtual resource based on the sizing recommendation, wherein the predetermined threshold range comprises an upper bound, and wherein the deviation is determined based on values in the respective capacity consumption model for the first virtual resource that are above the upper bound.

20. The computer program product of claim 15, wherein the computer-readable program code further comprises:

computer-readable program code configured to receive a processing capacity consumption threshold range; and computer-readable program code configured to receive a memory capacity consumption threshold range, wherein the predetermined threshold range comprises the processing capacity consumption threshold range and the memory capacity consumption threshold range.

* * * * *